United States Patent
Morita

(10) Patent No.: US 6,805,100 B2
(45) Date of Patent: Oct. 19, 2004

(54) COMBUSTION CONTROL APPARATUS AND COMBUSTION CONTROL METHOD FOR IN-CYLINDER INJECTION INTERNAL COMBUSTION ENGINE

(75) Inventor: Koji Morita, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/752,599

(22) Filed: Jan. 8, 2004

(65) Prior Publication Data

US 2004/0144358 A1 Jul. 29, 2004

(30) Foreign Application Priority Data

Jan. 27, 2003 (JP) ........................................ 2003-017043

(51) Int. Cl.⁷ ................................................ F00M 7/00
(52) U.S. Cl. ................... 123/436; 123/406.24; 123/491
(58) Field of Search ........................... 123/436, 406.24, 123/406.25, 406.59, 406.53, 491

(56) References Cited

U.S. PATENT DOCUMENTS

| | | | | |
|---|---|---|---|---|
| 4,365,599 A | * | 12/1982 | Ikeura | 477/111 |
| 4,382,484 A | * | 5/1983 | Anderson et al. | 180/165 |
| 4,441,573 A | * | 4/1984 | Carman et al. | 180/165 |
| 5,575,248 A | * | 11/1996 | Tada | 123/184.56 |
| 5,848,529 A | * | 12/1998 | Katoh et al. | 60/274 |
| 6,196,173 B1 | * | 3/2001 | Takahashi et al. | 123/90.15 |

FOREIGN PATENT DOCUMENTS

| | | |
|---|---|---|
| JP | A 3-61644 | 3/1991 |
| JP | A 8-4571 | 1/1996 |
| JP | A 9-158774 | 6/1997 |
| JP | A 10-169488 | 6/1998 |

* cited by examiner

Primary Examiner—John T. Kwon
(74) Attorney, Agent, or Firm—Kenyon & Kenyon

(57) ABSTRACT

With regard to a stabilization control which is executed while compression stroke injection is executed in an engine warming-up process, an execution period of the stabilization control is limited to a period until when an elapsed time since an engine is started reaches a predetermined time. Accordingly, after the elapsed time reaches a predetermined time, it is possible to suppress an unnecessary increase in a fuel injection amount or unnecessary advance of ignition timing by the stabilization control. Also, when an increase in the temperature of a catalyst is completed in the engine warming-up process, and a fuel injection mode is switched from the compression stroke injection to intake stroke injection, the stabilization control is restarted. Therefore, when the combustion becomes unstable due to use of heavy fuel and the engine speed drops while that intake stroke injection is executed, the combustion is stabilized by increasing the fuel injection amount and advancing the ignition timing by the stabilization control.

13 Claims, 10 Drawing Sheets

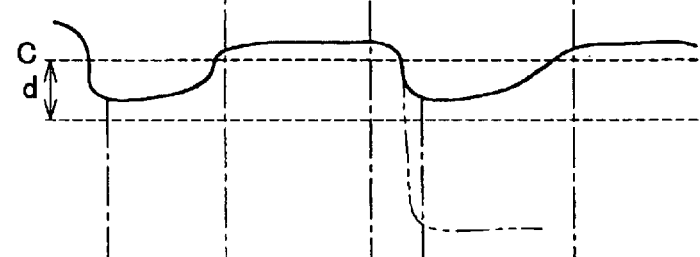
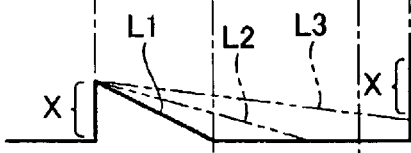
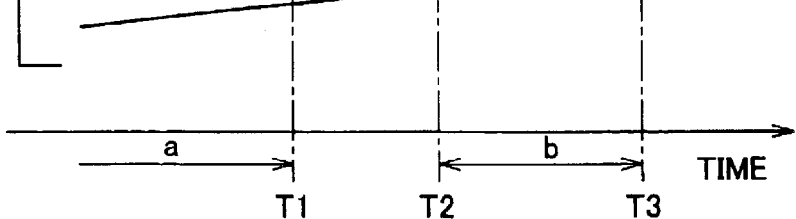

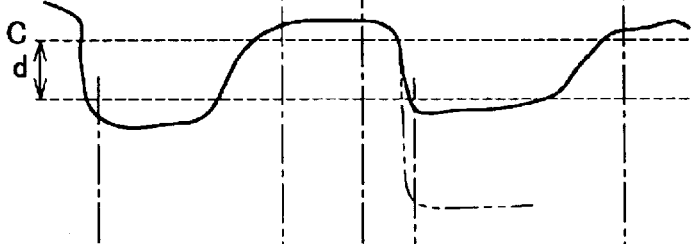

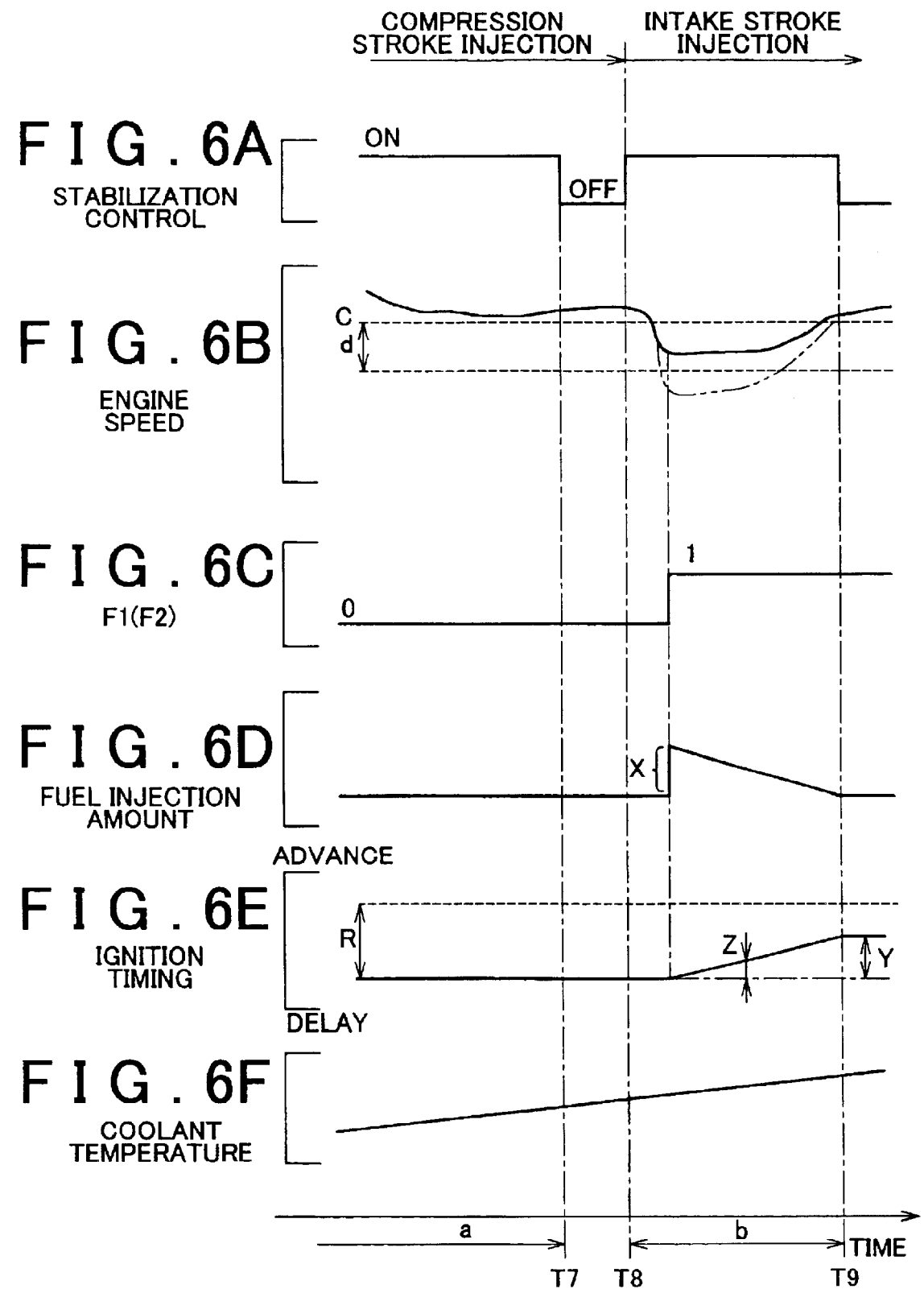

COMBUSTION CONTROL APPARATUS AND COMBUSTION CONTROL METHOD FOR IN-CYLINDER INJECTION INTERNAL COMBUSTION ENGINE

INCORPORATION BY REFERENCE

The disclosure of Japanese Patent Application No. 2003-017043 filed on Jan. 27, 2003 including the specification, drawings and abstract is incorporated herein by reference in its entirety.

BACKGROUND OF THE INVENTION

1. Field of the Invention

The invention relates to a combustion control apparatus and a combustion control method for an in-cylinder injection internal combustion engine.

2. Description of the Related Art

In an internal combustion engine mounted in an automobile or the like, the temperature of a catalyst is increased by increasing the temperature of exhaust gas in a warming-up process after the engine is started such that the catalyst is activated and necessary exhaust gas purification performance can be obtained early after the engine is started. Japanese Patent Laid-Open Publication No. 10-169488 proposes an in-cylinder injection internal combustion engine in which compression stroke injection is executed in an engine warming-up process from when the engine is started until when an increase in the temperature of a catalyst is completed such that the temperature of exhaust gas is increased, thereby increasing the temperature of the catalyst.

In the case where heavy fuel that has lower volatility than standard fuel is used in the in-cylinder injection internal combustion engine, combustion may deteriorate while the compression stroke injection is executed in the engine warming-up process. When the compression stroke injection is executed, ignition is performed while there is a combustible fuel-air mixture around an ignition plug, whereby combustion is performed. However, in the case where the compression stroke injection is executed in the engine warming-up process, and the heavy fuel having low volatility is used, it is difficult to allow a fuel-air mixture with a fuel concentration necessary for stable combustion to remain around the ignition plug at the time of ignition. Therefore, while the compression stroke injection is executed in the engine warming-up process in the case where the heavy fuel is used, combustion may deteriorate and the engine speed may drop, which may cause a stall or rough idling.

In order to address such problems due to use of the heavy fuel, it is proposed to perform a stabilization control which stabilizes combustion when the engine speed drops in the engine warming-up process. Examples of the stabilization control include a control that increases a fuel injection amount, which is disclosed in Japanese Patent Laid-Open Publication No. 8-4571, and a control that advances ignition timing, which is disclosed in Japanese Patent Laid-Open Publication No. 9-158774.

In the case where the aforementioned control that increases the fuel injection amount is executed, the fuel concentration of the air-fuel mixture around the ignition plug at the time of ignition is increased, whereby deterioration of the combustion due to use of heavy fuel can be suppressed when injection is executed in the engine warming-up process and heavy fuel is used. Also, when the temperature of the catalyst is increased in the engine warming-up process, preference is given to the increase in the temperature of the exhaust gas over realization of stable combustion, and the ignition timing is generally delayed. Since the delay amount of the ignition timing is decreased by the aforementioned control that advances the ignition timing, deterioration of the combustion is suppressed in the case where the compression stroke injection is executed in the engine warming-up process and heavy fuel is used.

Meanwhile, the engine speed may temporarily drop in the case where disturbance such as resistance when a vehicle takes off is applied to the internal combustion engine. The fuel injection amount is increased or the ignition timing is delayed by the stabilization control also based on such a temporary drop of the engine speed due to reason other than unstable combustion. In this case, a controlled variable such as the fuel injection amount or the ignition timing deviates from the optimum value for performing desired operation of the engine, which leads to deterioration of fuel efficiency and exhaust gas emission.

Accordingly, it is preferable that the stabilization control based on the drop of the engine speed should be executed, for example, only during a period from when the engine is started until when the combustion by the compression stroke injection is stabilized in the engine warming-up process, and the stabilization control should be stopped after the combustion is stabilized in the middle of execution of the compression stroke injection. By limiting the execution period of the stabilization control in this manner, an unnecessary increase in the fuel injection amount or unnecessary advance of the ignition timing based on the temporary drop of the engine speed due to disturbance can be suppressed, and therefore, deterioration of fuel efficiency and exhaust gas emission can be suppressed as much as possible.

In the in-cylinder injection internal combustion engine, in the case where the compression stroke injection is executed for increasing the temperature of the catalyst in the engine warming-up process, a fuel injection mode is switched from the compression stroke injection to intake stroke injection when the increase in the temperature of the catalyst is completed. In the case of the intake stroke injection, fuel injected into a combustion chamber is easily diffused in the combustion chamber until ignition. Therefore, the fuel concentration of the air-fuel mixture around the ignition plug at the time of ignition tends to be low in the engine warming-up process. Accordingly, the time required for the fuel concentration to reach a level necessary for obtaining stable combustion is long, as compared with the compression stroke injection.

Thus, in the case where heavy fuel having low volatility is used, when the fuel injection mode is switched from the compression stroke injection to the intake stroke injection after the increase in the temperature of the catalyst is completed as described above, it becomes difficult to allow the air-fuel mixture with a fuel concentration necessary for obtaining stable combustion to remain around the ignition plug at the time of ignition by the intake stroke injection. Thus, the combustion becomes unstable after the intake stroke combustion is started, which causes the engine speed to drop.

However, even if the engine speed drops due to unstable combustion after the intake stroke injection is started, the fuel injection amount cannot be increased and the ignition timing cannot be advanced based on the drop of the engine speed, since the stabilization control for suppressing the unstable combustion is stopped when the combustion is stabilized in the middle of execution of the compression stroke injection. Accordingly, the drop of the engine speed cannot be suppressed, and rough idling is caused due to the drop of the engine speed.

SUMMARY OF THE INVENTION

It is an object of the invention to provide a combustion control apparatus and a combustion control method for an in-cylinder injection internal combustion engine, which do not unnecessarily execute a stabilization control while compression stroke injection is executed after the engine is started, and can appropriately suppress unstable combustion by the stabilization control when a fuel injection mode is switched from the compression stroke injection to intake stroke injection.

A first aspect of the invention relates to a combustion control apparatus for an in-cylinder injection internal combustion engine including a stabilization controller, an execution stop controller, and a restart controller. The stabilization controller executes a stabilization control that stabilizes combustion by changing a controlled variable used for controlling operation of the engine when an engine speed drops in an engine warming-up process after the engine is started, wherein compression stroke injection is executed in the engine warming-up process. The execution stop controller limits an execution period of the stabilization control during which the stabilization control is executed, and stops the stabilization control in the middle of execution of the compression stroke injection. The restart controller restarts the stabilization control when a fuel injection mode is switched from the compression stroke injection to intake stroke injection.

With the aforementioned configuration, the stabilization control which is executed while the compression stroke injection is executed in the engine warming-up process can be stopped when the combustion by the compression stroke injection becomes stable, whereby an unnecessary change in the controlled variable for the internal combustion engine can be suppressed while the compression stroke injection is executed. Also, since the stabilization control is restarted when the fuel injection mode is switched from the compression stroke injection to the intake stroke injection, the controlled variable for the internal combustion engine is changed by the stabilization control for stabilizing the combustion when the combustion becomes unstable due to volatility of fuel used for the internal combustion engine and the like, and the engine speed drops while the intake stroke injection is executed. Thus, it is possible to suppress the drop of the engine speed, and occurrence of a stall or rough idling due to the drop of the engine speed.

In the first aspect of the invention, the controlled variable may include a fuel injection amount, and the stabilization controller may stabilize the combustion by increasing the fuel injection amount. In the case where fuel having low volatility is used, a fuel concentration of a fuel-air mixture around an ignition plug at the time of ignition is low while the compression stroke injection is executed in the engine warming-up process after the engine is started, the combustion deteriorates, and the engine speed drops. With the aforementioned configuration, the fuel injection amount is increased by the stabilization control based on the drop of the engine speed, and the fuel concentration of the fuel-air mixture around the ignition plug at the time of ignition is suppressed from becoming low. Thus, it is possible to suppress the deterioration of the combustion due to use of fuel having low volatility, and to suppress the drop of the engine speed and occurrence of a stall or rough idling due to the drop of the engine.

In the aforementioned aspect of the invention, the stabilization controller may decide an increase amount of the fuel injection amount based on a drop amount of the engine speed. Thus, since a volatility amount of the fuel in a combustion chamber is increased, and the fuel concentration of the fuel-air mixture around the ignition plug at the time of ignition becomes higher due to the increase in the fuel injection amount, the deterioration of the combustion due to use of heavy fuel can be suppressed in the case where the compression stroke injection is executed in the engine warming-up process and the heavy fuel is used.

In the aforementioned aspect of the invention, the stabilization controller may gradually decrease the increase amount of the fuel injection amount with time. When the engine temperature is gradually increased after the fuel injection amount is increased, the volatility of the fuel in the combustion chamber becomes higher, and the fuel concentration of the fuel-air mixture around the ignition plug at the time of ignition becomes higher. Thus, since the increase amount of the fuel injection amount is gradually decreased as the fuel concentration becomes higher, the fuel concentration can be suppressed from becoming extremely high.

In the aforementioned aspect of the invention, the controlled variable may include at least one of a fuel injection amount and ignition timing, and the stabilization controller may stabilize the combustion by at least one of increasing the fuel injection amount and advancing the ignition timing.

In the aforementioned aspect of the invention, the stabilization controller may decide an advance amount of the ignition timing based on a drop amount of the engine speed.

In the aforementioned aspect of the invention, ignition timing of the internal combustion engine may be controlled to be delayed by a predetermined delay amount while the compression stroke injection is executed in the engine warming-up process, the controlled variable may include the ignition timing, and the stabilization controller may stabilize the combustion by advancing the ignition timing by making a delay amount become smaller than the predetermined delay amount. While the compression stroke injection is executed in the engine warming-up process, preference is given to warming-up of an exhaust emission control catalyst and the like over the stabilization of the combustion, and therefore the ignition timing is controlled to be delayed by the predetermined delay amount so as to increase the temperature of exhaust gas. With the aforementioned configuration, the ignition timing is advanced by decreasing the delay amount by the stabilization control based on the drop of the engine speed. Thus, the combustion is stabilized, the drop of the engine speed can be suppressed, and occurrence of a stall or rough idling due to the drop of the engine speed can be suppressed.

In the aforementioned aspect of the invention, the controlled variable may include both a fuel injection amount and ignition timing, and the stabilization controller may stabilize the combustion by both increasing the fuel injection amount and advancing the ignition timing when a drop amount of the engine speed is larger than a predetermined amount; and the controlled variable may include only the fuel injection amount, and the stabilization controller may stabilize the combustion only by increasing the fuel injection amount among increasing the fuel injection amount and advancing the ignition timing when the drop amount of the engine speed is smaller than the predetermined amount. When the drop of the engine speed is small, the drop of the engine speed can be suppressed by increasing the fuel injection amount. Thus, since the ignition timing is not advanced when the drop amount of the engine speed is smaller than the predetermined amount, it is possible to suppress inhibition of the increase in the temperature of the exhaust gas and the like due to unnecessary advance of the ignition timing.

In the aforementioned aspect of the invention, the stabilization controller may change the execution period of the stabilization control after the engine is started based on an engine temperature when the engine is started. Since the volatility of the fuel in the combustion chamber varies depending on the engine temperature, the period during which the drop of the engine speed due to the low fuel concentration of the fuel-air mixture around the ignition plug at the time of ignition needs to be controlled by the stabilization control, that is, the period during which the combustion becomes unstable varies depending on the engine temperature. Thus, since the execution period of the stabilization control can be changed, the execution period can be set to a required minimum period, and the drop of the engine speed can be appropriately suppressed.

In the aforementioned aspect of the invention, the stabilization controller may change the execution period of the stabilization control that is restarted based on an engine temperature when the fuel injection mode is switched. Since the volatility of the fuel in the combustion chamber varies depending on the engine temperature, the period during which the drop of the engine speed due to the low fuel concentration of the fuel-air mixture around the ignition plug at the time of ignition needs to be controlled by the stabilization control, that is, the period during which the combustion becomes unstable varies depending on the engine temperature. Thus, since the execution period of the stabilization control can be changed, the execution period can be set to a required minimum period, and the drop of the engine speed can be appropriately suppressed.

A second aspect of the invention relates to a combustion control apparatus for an in-cylinder injection internal combustion engine including stabilization means, execution stop means, and restart means. The stabilization means executes a stabilization control that stabilizes combustion by changing a controlled variable used for controlling operation of the engine when an engine speed drops in an engine warming-up process after the engine is started, wherein compression stroke injection is executed in the engine warming-up process. The execution stop means limits an execution period of the stabilization control during which the stabilization control is executed, and stops the stabilization control in the middle of execution of the compression stroke injection. The restart means restarts the stabilization control when a fuel injection mode is switched from the compression stroke injection to intake stroke injection.

A third aspect of the invention relates to a combustion method for an in-cylinder injection internal combustion engine includes a first step of executing a stabilization control that stabilizes combustion by changing a controlled variable used for controlling operation of the engine when an engine speed drops in an engine warming-up process after the engine is started, wherein compression stroke injection is executed in the engine warming-up process; a second step of limiting an execution period of the stabilization control during which the stabilization control is executed, and stopping the stabilization control in the middle of execution of the compression stroke injection; and a third step of restarting the stabilization control when a fuel injection mode is switched from the compression stroke injection to intake stroke injection.

In the third aspect of the invention, the combustion control method further includes a fourth step of stopping the stabilization control when an elapsed time since the stabilization control is restarted in the third step becomes equal to or longer than a predetermined time.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4A to FIG. 4E are time charts describing the stabilization control;

FIG. 5A to FIG. 5F are time charts describing the stabilization control;

FIG. 6A to FIG. 6F are time charts describing the stabilization control;

DETAILED DESCRIPTION OF THE PREFERRED EMBODIMENTS

Hereinafter, a combustion control apparatus for an in-cylinder injection internal combustion engine according to an embodiment of the invention will be described with reference to FIG. 1 to FIG. 10. In the embodiment, the combustion control apparatus according to the invention is applied to an in-cylinder injection spark ignition engine which is mounted in an automobile.

Figure 1:
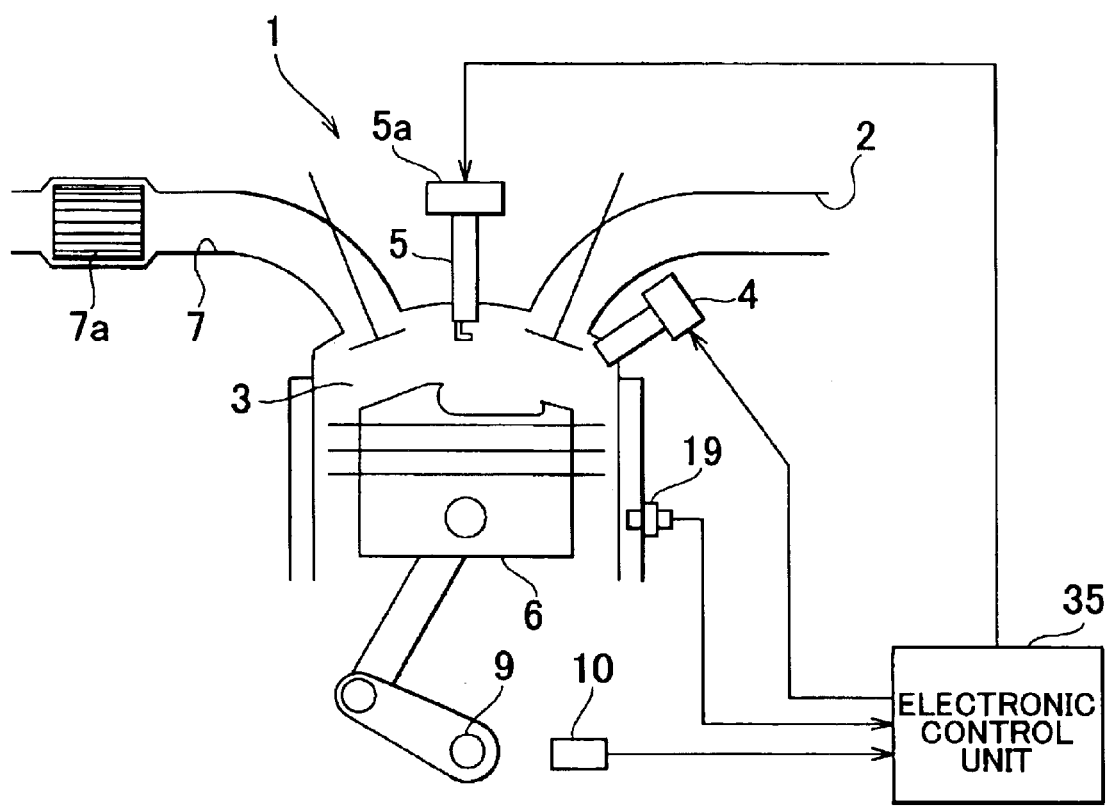
FIG. 1 is a schematic diagram showing an entire in-cylinder injection spark ignition engine to which a combustion control apparatus according to an embodiment of the invention is applied.

In an engine 1 shown in FIG. 1, air is taken from an intake passage 2 to a combustion chamber 3, the air is mixed with fuel injected into a combustion chamber 3 from a fuel injection valve 4 to form a fuel-air mixture, and the fuel-air mixture is ignited by an ignition plug 5. The ignition timing of the ignition plug 5 is adjusted by an ignitor 5a. When the fuel-air mixture in the combustion chamber 3 is burned due to ignition by the ignition plug 5, a piston 6 reciprocates due to the combustion energy at this time, and a crankshaft 9, which is an output shaft of the engine 1, is rotated. Also, after the combustion, the fuel-air mixture is delivered to an exhaust passage 7 as exhaust gas, and is purified by a catalyst 7a provided in the exhaust passage 7.

The operation of the engine 1 is controlled through an electronic control unit 35 mounted in an automobile. The electronic control unit 35 controls a fuel injection amount and a fuel injection mode of the engine 1 by driving the fuel injection valve 4, and controls the ignition timing of the engine 1 by driving the ignitor 5a. Also, the electronic control unit 35 receives detection signals from various sensors, such as a crank position sensor 10 which outputs a signal corresponding to the rotation of the crank shaft 9, and a coolant temperature sensor 19 which detects coolant temperature of the engine 1. Then, an engine speed is determined based on the detection signal from the crank position sensor 10, and the coolant temperature of the engine 1 is determined based on the detection signal from the coolant sensor 19.

In the engine warming-up process after the engine in a cooled state is started, compression stroke injection is executed as the fuel injection mode of the engine 1 controlled by the electronic control unit 35. The compression stroke injection is executed so that the temperature of the exhaust gas is increased, and the catalyst 7a is activated, thereby obtaining necessary exhaust gas purification performance early after the engine is started. When it is determined that the catalyst 7a is activated after the engine 1 is started, the fuel injection mode of the engine 1 is switched from the compression stroke injection to the intake stroke injection which is advantageous for warming-up of the engine 1.

However, in the case where heavy fuel that has lower volatility than standard fuel is used in engine 1, combustion may deteriorate while the compression stroke injection is executed in the engine warming-up process. When the compression stroke injection is executed, ignition is performed while there is a combustible fuel-air mixture around the ignition plug 5, whereby combustion is performed. However, in the case where the compression stroke injection is executed in the engine warming-up process, and the heavy fuel having low volatility is used, it is difficult to allow the fuel-air mixture with a fuel concentration necessary for stable combustion to remain around the ignition plug at the time of ignition. That is, the fuel concentration of the fuel-air mixture around the ignition plug 5 at the time of ignition is lower than a value necessary for obtaining stable combustion. As a result, the combustion deteriorates and the engine speed drops, which causes a stall or rough idling.

In order to address such problems due to use of heavy fuel, a stabilization control that stabilizes combustion by changing a controlled variable is executed when the engine speed drops in the engine warming-up process.

When changing a fuel injection amount as the change in the controlled variable by the stabilization control, the fuel injection amount is increased based on the drop of the engine speed. By increasing the fuel injection amount, the volatility amount of fuel in the combustion chamber 3 is increased, and the fuel concentration of the fuel-air mixture around the ignition plug 5 at the time of ignition becomes higher. Therefore, deterioration of the combustion due to use of heavy fuel can be suppressed in the case where the compression stroke injection is executed in the engine warming-up process, and the heavy fuel is used.

Also, when changing ignition timing as the change in the controlled variable by the stabilization control, the ignition timing is advanced based on the drop of the engine speed. Also, when the temperature of the catalyst is increased (i.e., the temperature of the exhaust gas is increased) in the engine warming-up process, preference is given to the increase in the temperature of the exhaust gas over realization of stable combustion, and the ignition timing is generally delayed by a predetermined delay amount. Since the delay amount of the ignition timing is decreased by advancing the ignition timing based on the drop of the engine speed, deterioration of the combustion can be suppressed in the case where the injection is executed in the engine warming-up process, and the heavy fuel is used.

Figure 2:
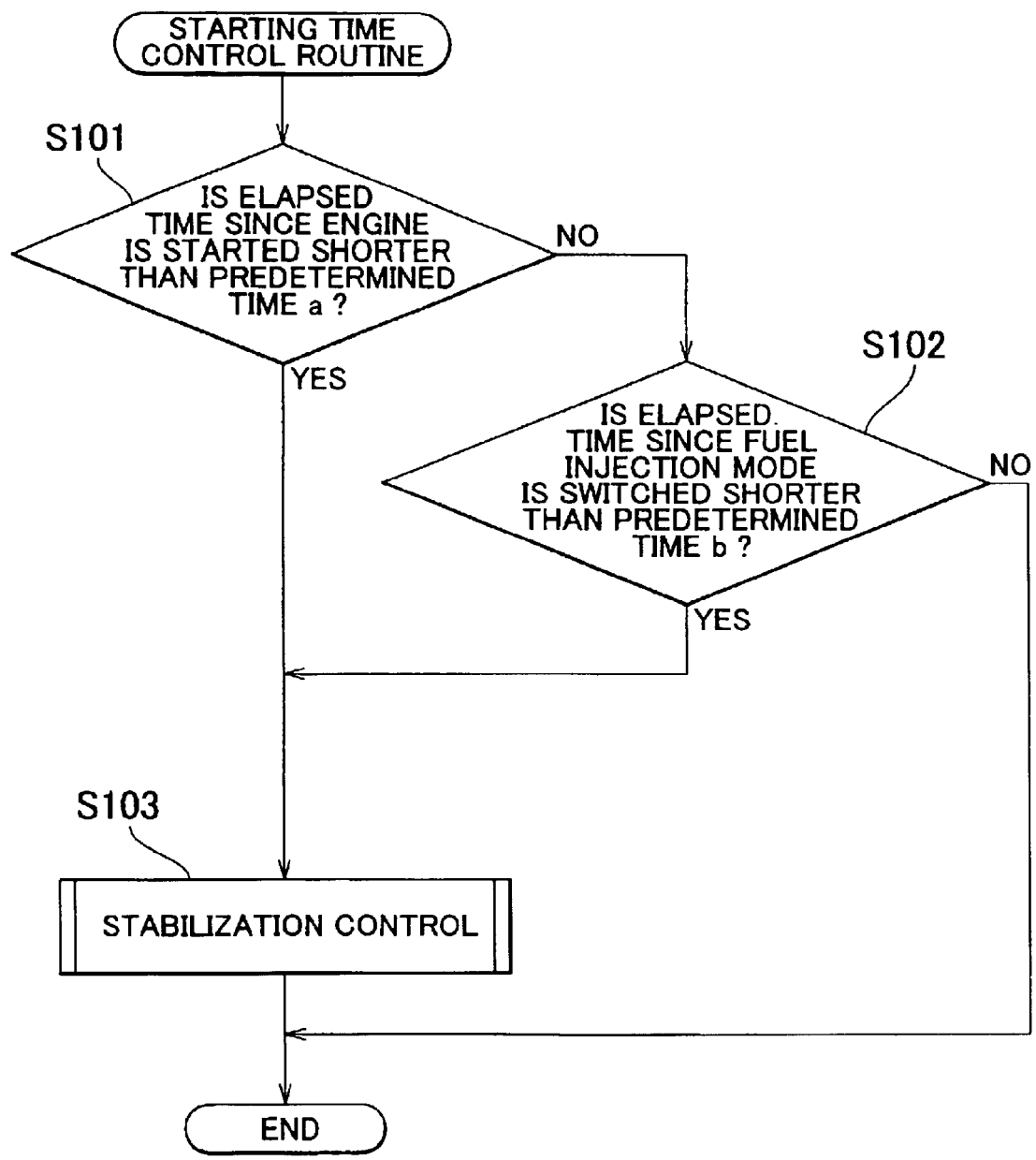
FIG. 2 is a flowchart showing a procedure of executing a stabilization control.

Next, the execution of the stabilization control will be described with reference to a flowchart of a starting time control routine shown in FIG. 2. The starting time control routine is executed, for example by time interrupts at predetermined time intervals.

In the engine warming-up process after the engine is started, first, the compression stroke injection for increasing the temperature of the catalyst is executed, and then a fuel injection mode is switched from the compression stroke injection to intake stroke injection when the temperature of the catalyst 7a is increased and the catalyst 7a is activated. The aforementioned stabilization control is executed while the compression stroke injection for increasing the temperature of the catalyst is executed.

While the compression stroke injection is executed, the engine speed temporarily drops in the case where disturbance such as resistance when a vehicle takes off is applied to the engine 1, in addition to the drop of the engine speed due to use of heavy fuel. The fuel injection amount is increased or the ignition timing is delayed by the stabilization control also based on such a temporary drop of the engine speed due to reason other than unstable combustion. In this case, the fuel injection amount or the ignition timing deviates from the optimum value for performing desired operation of the engine, which leads to deterioration of fuel efficiency and exhaust gas emission. Accordingly, it is preferable that the stabilization control should be executed only during a required minimum period in order to suppress an unnecessary increase in the fuel injection amount or unnecessary advance of the ignition timing based on the temporary drop of the engine speed.

Figure 3A:
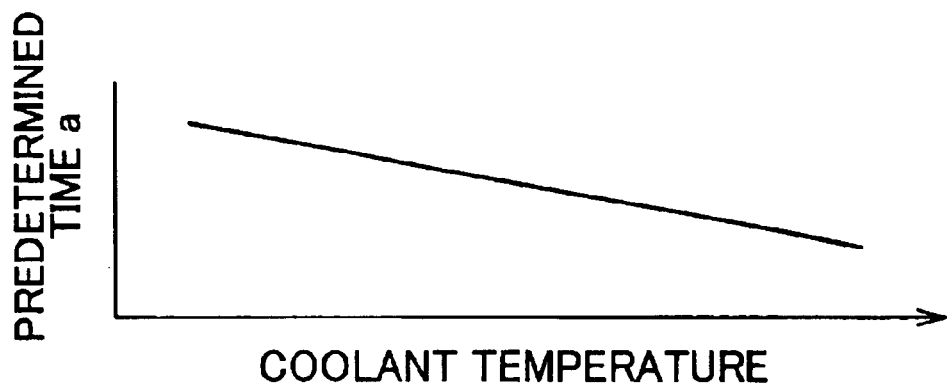
FIG. 3A is a graph showing a change in a predetermined time a with respect to a change in coolant temperature.

In the starting time control routine, an elapsed time since the engine 1 is started is shorter than a predetermined time a (i.e., an affirmative determination is made in step S101), the stabilization control is executed (S103). The predetermined time a is shorter than a period during which the compression stroke injection is executed after the engine is started, and is a time required for stabilizing combustion by the compression stroke injection. For example, the predetermined time a is calculated based on the coolant temperature of the engine 1 when the engine 1 is started. Thus, the time a thus calculated is shorter as the coolant temperature when the engine 1 is started is higher, as shown in FIG. 3A.

The aforementioned stabilization control is stopped on the condition that the elapsed time since the engine 1 is started is equal to or longer than the predetermined time a (i.e., a negative determination is made in step S101), and the compression stroke injection continues to be executed (i.e., a negative determination is made in step S102). Accordingly, the execution period of the stabilization control is limited to the period until when the elapsed time since the engine 1 is started reaches the predetermined time a while the compression stroke injection is executed in the engine warming-up process, that is, the period until when the combustion by the compression stroke injection in the engine warming-up process is stabilized. By limiting the execution period of the stabilization control in this manner, it is possible to suppress, as much as possible, an unnecessary increase in the fuel injection amount or unnecessary advance of the ignition timing based on the temporary drop of the engine speed due to disturbance, and deterioration of fuel efficiency and exhaust gas emission.

The fuel injection mode is switched from the compression stroke injection to the intake stroke injection when the increase in the temperature of the catalyst is completed by the compression stroke injection in the engine warming-up process. In the case of the intake stroke injection, fuel injected into a combustion chamber 3 is easily diffused in the combustion chamber 3 until ignition. Therefore, the fuel concentration of the air-fuel mixture around the ignition plug 5 at the time of ignition tents to be low in the engine warming-up process. Accordingly, the time required for the fuel concentration to reach a level necessary for obtaining stable combustion is long, as compared with the compression stroke injection.

Thus, in the case where heavy fuel having low volatility is used, when the fuel injection mode is switched from the compression stroke injection to the intake stroke injection after the increase in the temperature of the catalyst is completed, it becomes difficult to allow the air-fuel mixture with a fuel concentration necessary for obtaining stable combustion around the ignition plug at the time of ignition by the intake stroke injection. That is, the fuel concentration of the fuel-air mixture around the ignition plug 5 at the time of ignition is lower than a value necessary for obtaining stable combustion. As a result, combustion deteriorates and the engine speed drops, which causes a stall or rough idling of the engine 1.

In the case where the engine speed drops due to unstable combustion after the intake stroke injection is executed, if the stabilization control were not executed, the fuel injection amount would not be increased, and the ignition timing would not be advanced for stabilizing the combustion. Accordingly, the drop of the engine speed would not be suppressed. Therefore, in the starting time control routine, when the elapsed time since the fuel injection mode is switched from the compression stroke injection to the intake stroke injection is shorter than the predetermined time (i.e., an affirmative determination is made in step S102), the stabilization control is executed (S103). Thus, the stabilization control, which was stopped when the combustion was stabilized in the case where combustion stroke injection was executed, is restarted.

Figure 3B:
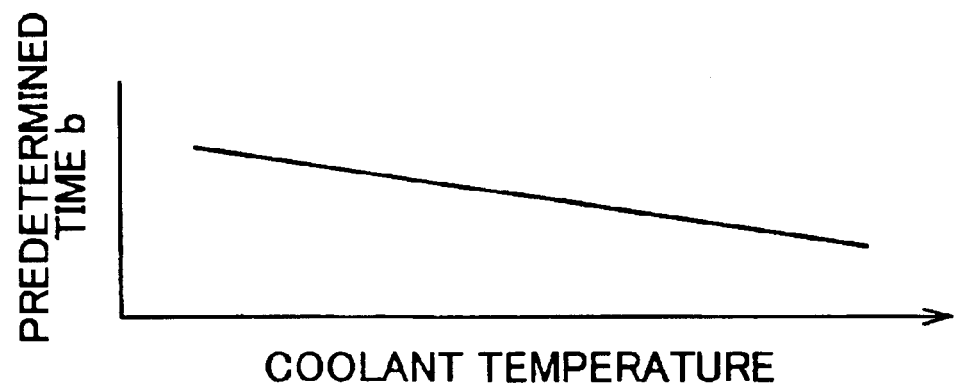
FIG. 3B is a graph showing a change in a predetermined time b with respect to a change in coolant temperature.

The stabilization control, which is executed after the fuel injection mode is switched, is stopped when an elapsed time since the fuel injection mode is switched is equal to or longer than a predetermined time b (i.e., a negative determination is made in step S S102). The predetermined time b is a time required for stabilizing the combustion by the intake stroke injection. For example, the predetermined time b is calculated based on the coolant temperature of the engine 1 when the fuel injection mode is switched from the compression stroke injection to the intake stroke injection. The predetermined time b thus calculated is shorter as the coolant temperature when the fuel injection mode is switched is higher, as shown in FIG. 3B.

Since the stabilization control is restarted when the fuel injection mode is switched from the compression stroke injection to the intake stroke injection, and the stabilization control is executed during the predetermined period, the stabilization control can be executed only during a required minimum period, and the drop of the engine speed can be suppressed by the stabilization control even if the engine speed drops due to unstable combustion after the intake stroke injection is started. Thus, the drop of the engine speed can be suppressed by increasing the fuel injection amount, or by both increasing the fuel injection amount and advancing the ignition timing by the stabilization control, and occurrence of a stall or rough idling after the intake stroke injection is started can be suppressed.

Next, the outline of the stabilization control will be described with reference to time charts in FIG. 4A to FIG. 6F. FIG. 4A to FIG. 4E describe a stabilization control in the case where the drop of the engine speed is relatively small (hereinafter, referred to as "stabilization control 1"). FIG. 5A to FIG. 5F describe a stabilization control in the case where the drop of the engine speed is relatively large (hereinafter, referred to as "stabilization control 2"). Also, FIG. 6A to FIG. 6F describe a stabilization control in the case where the engine speed does not drop while the compression stroke injection is executed, and the engine speed drops after the fuel injection mode is switched from the compression stroke injection to the intake stroke injection (hereinafter, referred to as "stabilization control 3"). Each of the stabilization control 1, the stabilization control 2, and the stabilization control 3 will be described with reference to the corresponding drawing.

First, the stabilization control 1 will be described. As shown in FIG. 4A to FIG. 4E, the stabilization control is executed until the elapsed time since the engine 1 is started reaches the predetermined time a in the case where the compression stroke injection is executed for increasing the temperature of the catalyst. At this time, if the engine speed drops to a value lower than a predetermined value c due to use of heavy fuel, the fuel injection amount is increased, or the fuel injection amount is increased and also the ignition timing is advanced based on whether a drop amount of the engine speed is smaller than a predetermined value d.

Since the drop amount of the engine speed is smaller than the predetermined value d, the combustion is stabilized by increasing the fuel injection amount. The fuel injection amount is increased by an increase amount value X by a stabilization control routine shown in FIG. 8 and FIG. 9, which is executed through the electronic control unit 35 every time the starting time control routine (FIG. 2) proceeds to step S103. Since the fuel injection amount is increased by the increase amount value X, the combustion is stabilized, and the drop of the engine speed is suppressed while the compression stroke injection is executed.

Also, when the fuel injection amount is increased, a first stabilization flag F1 is set to 1 to indicate that the stabilization is being executed. The first stabilization flag F1 is for determining whether the combustion has been stabilized only by increasing the fuel injection amount among increasing the fuel injection amount and advancing the ignition timing. The first stabilization flag F1 is reset, and is set to 0 to indicate that the stabilization has not been executed when the fuel injection mode is switched from the compression stroke injection to the intake stroke injection in the engine warming-up process, or when the engine is stopped.

The increase amount value X is gradually decreased as the coolant temperature of the engine 1 indicating the engine temperature is increased toward a value at which the combustion by the compression stroke injection is stabilized. The increase amount value X is thus decreased, for example, by a routine for both increasing the injection amount and advancing the ignition timing (hereinafter, referred to as "injection amount increase/ignition timing advance routine") shown in FIG. 10, which is executed at a predetermined crank angle through the electronic control unit 35. Thus, the increase amount of the fuel injection amount is gradually decreased with time, for example as shown by a solid line L1 in FIG. 4D. A rate at which the increase amount of the fuel injection amount (i.e., the increase amount value X) is decreased at this time can be changed, for example, based on the coolant temperature of the engine 1. The increase amount value X is attenuated at a smaller rate as the coolant temperature is lower, as sequentially shown by the solid line L1, a chain double-dashed line L2, and a chain double-dashed line L3. Thus, when the coolant temperature reaches a value at which the combustion by the compression stroke injection is stabilized, the increase amount of the fuel injection amount (i.e., the increase amount value X) becomes 0.

The stabilization control is stopped when the elapsed time since the engine 1 is started reaches the predetermined time a (at time T1), and the coolant temperature reaches the value at which the combustion by the compression stroke injection is stabilized. During a period from time T1 until when the fuel injection mode is switched to the intake stroke injection (at time T2), the fuel injection amount is not increased based on the drop of the engine speed. In the case where the fuel injection amount is increased by the increase amount value X based on the drop of the engine speed during the period from when the engine 1 is started until when the elapsed time since the engine 1 is started reaches the predetermined time a, the increase amount value X may not be decreased to 0 at and immediately after the time when the elapsed time reaches the predetermined time a (as shown by the chain double-dashed line L2). Also, the increase amount value X may not be decreased to 0 at and immediately after the time when the fuel injection mode is switched to the intake stroke injection (as shown by the chain double-dashed line L3).

When the fuel injection mode is switched to the intake stroke injection, the engine speed may drop to a value lower than the predetermined value c due to use of heavy fuel. If the stabilization control were not be restarted when the fuel injection mode is switched to the intake stroke injection, the combustion would not be stabilized by increasing the fuel injection amount or by advancing the ignition timing in the case where the engine speed drops as described above. Therefore, the engine speed would drop to a large extend as shown by a chain double-dashed line in FIG. 4B. As a result, a stall or rough idling of the engine 1 would be caused.

However, since the stabilization control is restarted when the fuel injection mode is switched to the intake stroke injection (at time T2), the combustion is stabilized by increasing the fuel injection amount, or by both increasing the fuel injection amount and advancing the ignition timing when the engine speed drops to a value lower than the predetermined value c, and the drop of the engine speed can be suppressed. Accordingly, it is possible to suppress occurrence of a stall or rough idling due to the drop of the engine speed. After the stabilization is restarted, the stabilization control is executed until the elapsed time since the fuel injection mode is switched becomes equal to or longer than the predetermined time b (at time T3).

FIGS. 4A to 4E show the case where the drop amount of the engine speed while the compression stroke injection is executed is smaller than the predetermined value d, and the combustion is stabilized only by increasing the fuel injection amount by the injection amount value X. At this time, the fuel injection amount is increased by the increase amount value X also by the stabilization routine shown in FIG. 8 and FIG. 9. In the case where the fuel injection amount is increased by the increase amount value X while the compression stroke injection is executed, and the increase amount value X does not reach 0 by the time at which the fuel injection amount starts to be increased while the intake stroke injection is executed (as shown by a chain double-dashed line L3), the fuel injection amount at this time is increased by the increase amount value X.

When the fuel injection amount is increased by the increase amount value X while the intake stroke injection is executed, the first stabilization flag F1 is set to 1 to indicate that stabilization is being executed. Also, the increase amount value X is gradually decreased by the injection amount increase/ignition timing advance routine shown in FIG. 10 as the coolant temperature indicating the temperature of the engine 1 is increased toward a value at which the combustion by the intake stroke injection is stabilized. Therefore, the increase amount of the fuel injection amount is gradually decreased with time, for example, as shown by the solid line L1 in FIG. 4D. A rate at which the increase amount of the fuel injection amount (i.e., the increase amount value X) is decreased at this time can be also changed, for example, based on the coolant temperature of the engine 1. The increase amount value X is attenuated at a smaller rate as the coolant temperature is lower. Thus, when the coolant temperature reaches the value at which the combustion by the intake stroke injection is stabilized, the increase amount of the fuel injection amount (i.e., the increase amount value X) becomes 0.

Next, the stabilization control 2 will be described. As shown in FIG. 5A to FIG. 5F, in the case where the engine speed drops by a value equal to or larger than the predetermined value d with respect to the predetermined value c due to use of heavy fuel during the stabilization control while the compression stroke injection is executed, the combustion is stabilized by both increasing the fuel injection amount and advancing the ignition timing. At this time, the fuel injection amount is increased by the increase amount value X also by the stabilization control routine in FIG. 8 and FIG. 9. In addition, the ignition timing starts to be advanced also by the stabilization control routine in FIG. 8 and FIG. 9. In other words, although the ignition timing is delayed, for example by a predetermined delay amount R for increasing the temperature of the catalyst while the compression stroke injection is executed, the delay amount R starts to be decreased so that the ignition timing starts to be advanced.

Thus, the combustion is stabilized by both increasing the fuel injection amount and advancing the ignition timing while the compression stroke injection is executed, and the drop of the engine speed is suppressed. When the fuel injection amount is increased and also the ignition timing is advanced, a second stabilization flag F2 is set to 1 to indicate that stabilization is being executed. The second stabilization flag F2 is for determining whether the combustion has been stabilized by both increasing the fuel injection amount and advancing the ignition timing. The second stabilization flag F2 is reset, ands set to 0 to indicate that stabilization has not been executed when the fuel injection mode is switched from the compression stroke injection to the intake stroke injection in the engine warming-up process, or when the engine is stopped.

Figure 10:
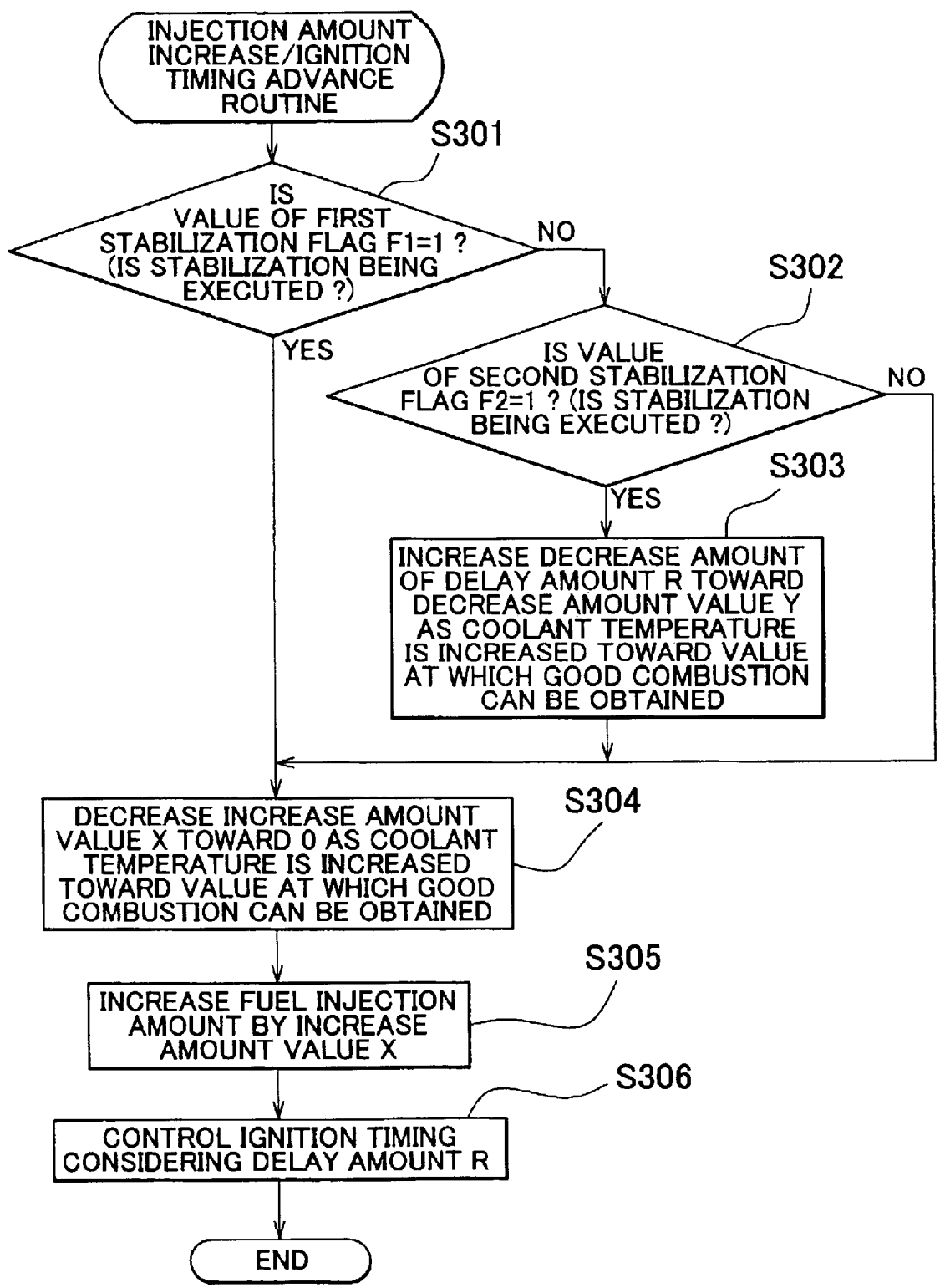
FIG. 10 is a flowchart showing a procedure of attenuating a decrease amount of the delay amount of the ignition timing.

The increase amount value X is gradually decreased by the injection amount increase/ignition timing advance routine in FIG. 10, as in the case of the stabilization control 1. Also, a decrease amount Z of the delay amount R is gradually increased toward a decrease amount value Y by the injection amount increase/ignition timing advance routine in FIG. 10, as the coolant temperature of the engine 1 is increased toward the value at which the combustion by the compression stroke injection is stabilized. Accordingly, the delay amount R of the ignition timing is gradually decreased with time, for example as shown in FIG. 5E. A rate at which the delay amount R is decreased at this time can be changed, for example, based on the coolant temperature of the engine 1. The delay amount R is attenuated at a smaller rate as the coolant temperature is lower. When the coolant temperature reaches the value at which the combustion by the compression stroke injection is stabilized, the increase amount of the fuel injection amount (i.e., the increase amount value X) becomes 0, and the decrease amount Z of the delay amount R of the ignition timing becomes equal to the decrease amount value Y by decreasing the increase amount value X and the delay amount R as described above.

The stabilization control is stopped when the elapsed time since the engine 1 is started reaches the predetermined time a (at time T4), and the coolant temperature reaches the value at which the combustion by the compression stroke injection is stabilized. Subsequently, when the increase in the temperature of the catalyst is completed, and the fuel injection mode is switched to the intake stroke injection (at time T5), the second stabilization flag F2 is set to 0 to indicate that stabilization has not been executed, and the stabilization control is restarted. In the case where the engine speed drops to a value lower than the predetermined value c during the stabilization control which is restarted, and the drop amount with respect to the predetermined value c is larger than the predetermined value d, the combustion is stabilized by both increasing the fuel injection amount by the increase amount value X and advancing the ignition timing by decreasing the delay amount R. Thus, the drop of the engine speed is suppressed, and occurrence of a stall or rough idling due to the drop of the engine speed is also suppressed. At this time, the fuel injection amount is increased by the increase amount value X, and the delay amount R of the ignition timing starts to be decreased also by the stabilization control routine in FIG. 8 and FIG. 9.

When the fuel injection amount is increased by the increase amount value X and the delay amount R of the ignition timing starts to be decreased while the intake stroke injection is executed, the second stabilization flag F2 is set to 1 to indicate that stabilization is being executed. The increase amount value X and the delay amount R are gradually decreased also by the injection amount increase/ignition timing advance routine in FIG. 10. The decrease amount Z of the delay amount R is gradually increased toward the decrease amount value Y by the injection amount increase/ignition timing advance routine in FIG. 10, as the coolant temperature of the engine 1 is increased toward the value at which the combustion by the intake stroke injection is stabilized. Accordingly, the delay amount R of the ignition timing is gradually decreased with time, for example as shown in FIG. 5E. A rate at which the delay amount R of the ignition timing is decreased at this time can be also changed, for example, based on the coolant temperature of the engine 1. The delay amount R is attenuated at a smaller rate as the coolant temperature is lower. When the coolant temperature reaches the value at which the combustion by the intake stroke injection is stabilized, the increase amount of the fuel injection amount (i.e., the increase amount value X) becomes 0, and the decrease amount Z of the delay amount R of the ignition timing becomes equal to the decrease amount value Y by decreasing the increase amount value X and the delay amount R as described above.

Description has been made of the case where the drop amount of the engine speed with respect to the predetermined value c is equal to or larger than the predetermined value d after the fuel injection mode is switched to the intake stroke injection. However, in the case where the drop amount is smaller than the predetermined value d, the same control as the stabilization control 1 is executed. In other words, the combustion is stabilized only by increasing the fuel injection amount, and the first stabilization flag F1 is set to 1 to indicate that stabilization is being executed.

The stabilization control 3 will be described. As shown in FIG. 6A to FIG. 6F, there is a case where the engine speed does not drop due to use of heavy fuel during the stabilization control while the compression stroke injection is executed, and the engine speed drops to a value lower than the predetermined value c after the fuel injection mode is switched to the intake stroke injection and the stabilization control is restarted (at time T8).

For example, when the drop amount of the engine speed with respect to the predetermined value c is smaller than the predetermined value d, the combustion is stabilized only by increasing the fuel injection amount by the increase amount value X as shown in FIG. 6D, as in the case of the stabilization control 1. Thus, the drop of the engine speed is suppressed, and occurrence of a stall or rough idling due to the drop of the engine speed is also suppressed. When the fuel injection amount starts to be increased as described above, the first stabilization flag F1 is set to 1 to indicate that stabilization is being executed.

Meanwhile, when the drop amount of the engine speed with respect to the predetermined value c is equal to or larger than the predetermined value d, the combustion is stabilized by both increasing the fuel injection amount by the increase amount value X and advancing the ignition timing by decreasing the delay amount R as shown in FIG. 6D and FIG. 6E, as in the case of the stabilization control 2. Thus, the drop of the engine speed is suppressed, and occurrence of a stall or rough idling due to the drop of the engine speed is also suppressed. When the fuel injection amount starts to be increased and the ignition timing starts to be advanced, the second stabilization flag F2 is set to 1 to indicate that stabilization is being executed.

Figure 8:
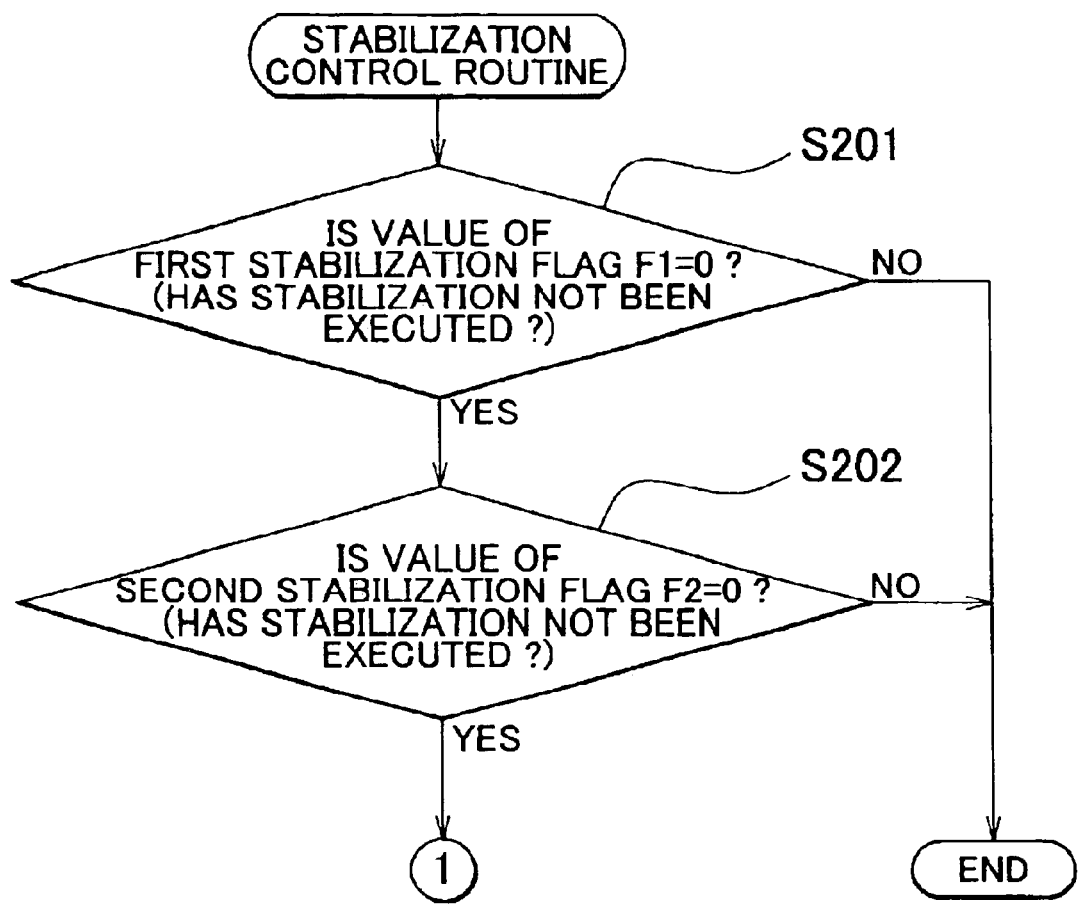
FIG. 8 is a flowchart showing a procedure of increasing a fuel injection amount and decreasing a delay amount of ignition timing (advancing ignition timing) based on the drop of the engine speed.
Figure 9:
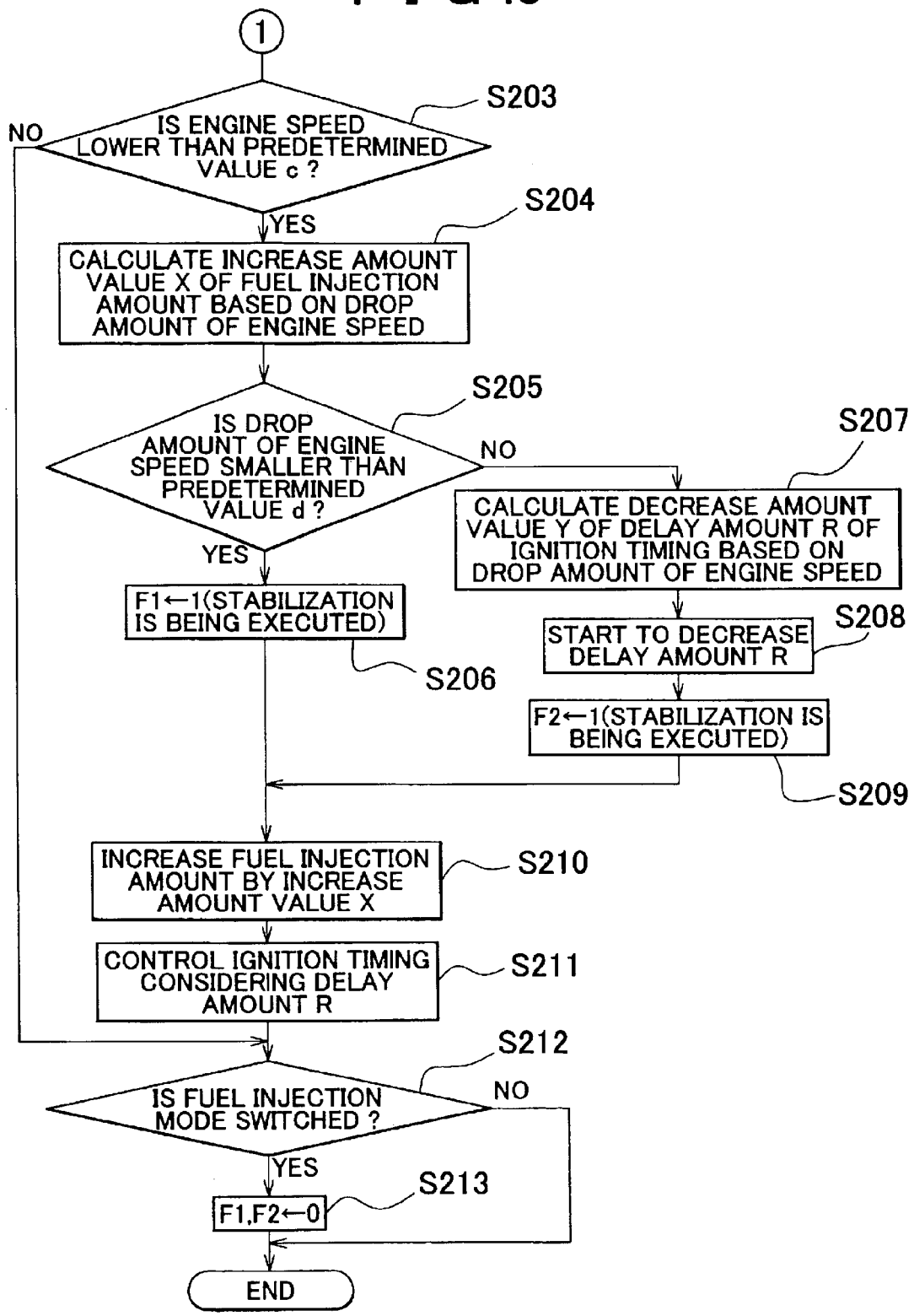
FIG. 9 is a flowchart showing a procedure of increasing the fuel injection amount and decreasing the delay amount of the ignition timing (advancing ignition timing) based on the drop of the engine speed.

Next, the stabilization control routine will be described with reference to the flowchart shown in FIG. 8 and FIG. 9. The stabilization routine is executed through the electronic control unit 35 every time the starting time control routine in FIG. 2 proceeds to step S103.

The stabilization control routine proceeds to the processes for increasing the fuel injection amount and advancing the ignition timing based on the drop of the engine speed (steps S203 to S211 (FIG. 9)) on the condition that both the value of the first stabilization flag F1 and the value of the second stabilization flag F2 are 0 to indicate that stabilization has not been executed (i.e., affirmative determinations are made both in step S201 and step S202 (FIG. 8)).

Figure 7A:
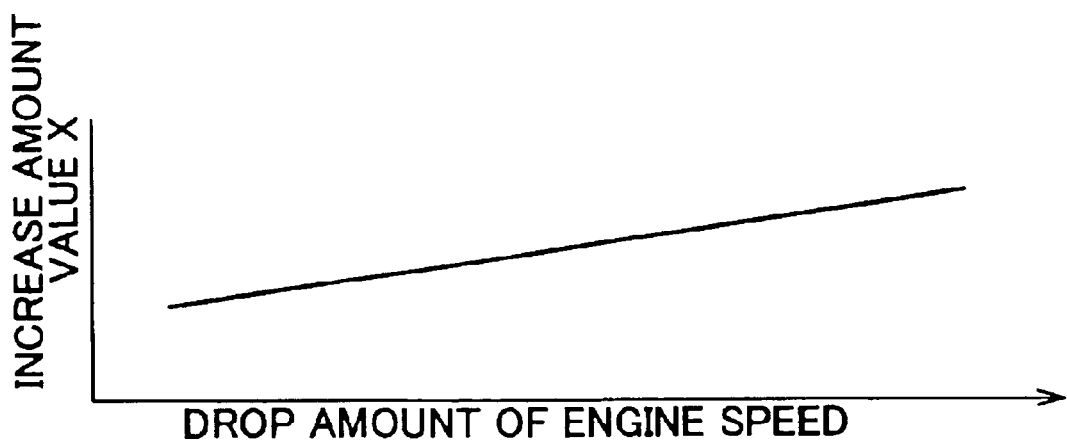
FIG. 7A is a graph showing a change in an increase amount value X with respect to a drop amount of an engine speed.

In the processes, when the engine speed is lower than the predetermined value c (i.e., an affirmative determination is made in step S203), the increase amount value X of the fuel injection amount is calculated based on the drop amount of the engine speed with respect to the predetermined value c (S204). The increase amount value X thus calculated is increased as the drop amount increases, as shown in FIG. 7A.

When the drop amount is smaller than the predetermined value d (an affirmative determination is made in step S205), the first stabilization flag F1 is set to 1 to indicate that stabilization is being executed (S206), and the fuel injection amount is increased by the increase amount value X (S210). Thus, the combustion is stabilized. Though the ignition timing is controlled considering the delay amount R (S211), the delay amount R is not decreased. Therefore, the ignition timing is not advanced for stabilizing the combustion.

Figure 7B:
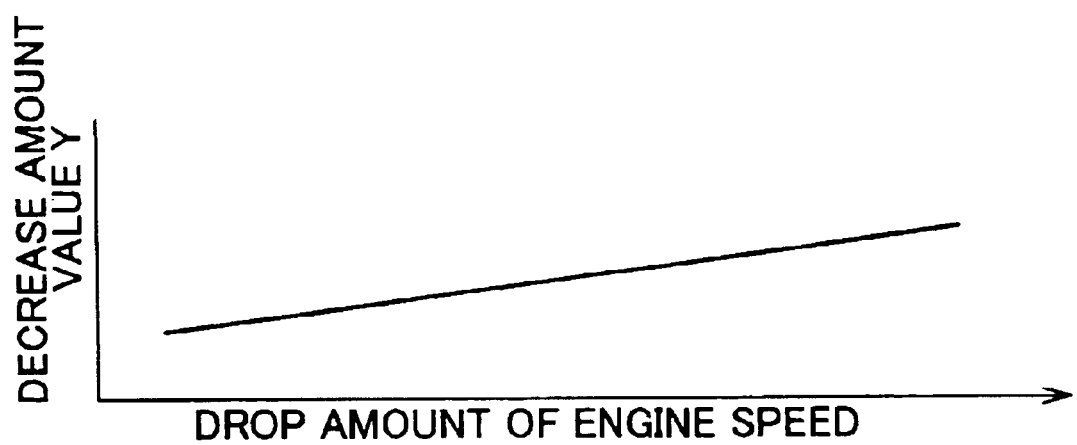
FIG. 7B is a graph showing a change in a decrease amount Y with respect to the drop amount of the engine speed.

When the drop amount is equal to or larger than the predetermined value d (i.e., a negative determination is made in step S205), the decrease amount value Y of the delay amount R of the ignition timing is calculated based on the drop amount (S207). The decrease amount value Y thus calculated is increased as the drop amount increases as shown in FIG. 7B. Subsequently, the delay amount R starts to be decreased (S208), and the second stabilization flag F2 is set to 1 to indicate that stabilization is being executed (S209). Accordingly, in this case, the fuel injection amount is increased by the increase amount value X (S210). In addition, the decrease amount Z of the delay amount R is increased toward the decrease amount value Y, and therefore the ignition timing is controlled considering the delay amount R (S211), whereby the ignition timing is advanced.

When the fuel injection mode is switched from the compression stroke injection to the intake stroke injection (i.e., an affirmative determination is made in step S212), the first stabilization flag F1 or the second stabilization flag F2, which has been set to 1 to indicate that stabilization is being executed, is reset, and is set to 0 to indicate that stabilization has not been executed (S213).

Next, the injection amount increase/ignition timing advance routine will be described with reference to the flowchart in FIG. 10. The injection amount increase/ignition timing advance routine is executed for attenuating the increase amount of the fuel injection amount and the delay amount of the ignition timing after the fuel injection amount is increased and the ignition timing starts to be advanced (i.e., the delay amount starts to be decreased).

In the injection amount increase/ignition timing advance routine, when the first stabilization flag F1 is set to 1 to indicate that stabilization is being executed (i.e., an affirmative determination is made in step S301), the increase amount value X is decreased (S304). That is, the increase amount value X is decreased toward 0 as the coolant temperature is increased toward the value at which good combustion can be obtained. Therefore, since the fuel injection amount is increased by the increase amount value X in next step S305, the increase amount is gradually attenuated with time, and becomes 0 when the coolant temperature reaches the value at which good combustion can be obtained. Although the ignition timing is controlled considering the delay amount R at this time (S306), the delay amount R is not decreased. Therefore, the ignition timing is not advanced for stabilizing the combustion.

Steps S304 to S306 are executed also when both the value of the first stabilization flag F1 and the value of the second stabilization flag F2 are 0 to indicate that stabilization has not been executed (i.e., negative determinations are made both in step S301 and step S302). However, since the increase amount value X has already become 0 in step 304, the fuel injection amount is not increased in step S305. Also, step S306 in which the ignition timing is advanced for stabilizing the combustion is not executed.

Meanwhile, when the value of the second stabilization flag F2 is 1 to indicate that stabilization is being executed (i.e., an affirmative determination is made in step S302), the delay amount R is decreased (S303). In other words, the decrease amount Z of the delay amount R is increased toward the decrease amount value Y as the coolant temperature is increased toward the value at which good combustion can be obtained. Therefore, the increase amount value X of the fuel injection amount is attenuated, and the delay amount R of the ignition timing is attenuated by executing processes in steps S304 to S306.

According to the embodiment that has been described, the following effects can be obtained.

(1) With regard to the stabilization control which is executed while the compression stroke injection is executed in the engine warming-up process, the execution period of the stabilization control is limited to the period until when the elapsed time since the engine is started reaches the predetermined time a that is a time required for stabilizing the combustion by the compression stroke injection. Accordingly, after the elapsed time reaches the predetermined time a, the stabilization control is stopped. Therefore, it is possible to suppress an unnecessary increase in the fuel injection amount and unnecessary advance of the ignition timing by the stabilization control. Also, the stabilization control is restarted when the increase in the temperature of the catalyst is completed in the engine warming-up process, and the fuel injection mode is switched from the compression stroke injection to the intake stroke injection. Therefore, when the combustion becomes unstable due to use of heavy fuel and the engine speed drops while the intake stroke injection is executed, the combustion is stabilized by increasing the fuel injection amount and advancing the ignition timing by the stabilization control, and the drop of the engine speed is suppressed. Accordingly, it is possible to suppress occurrence of a stall or rough idling due to the drop of the engine speed.

(2) The deterioration of the combustion due to use of heavy fuel occurs because the fuel concentration of the fuel-air mixture which exits around the ignition plug 5 at the time of ignition is lower than the value necessary for obtaining good combustion since the volatility of the fuel in the combustion chamber 3 is low. Accordingly, when the engine speed drops due to the deterioration of the combustion, it is possible to appropriately suppress the fuel concentration of the fuel-air mixture around the ignition plug 5 at the time of ignition from becoming low by increasing the fuel injection amount. Therefore, it is possible to appropriately suppress the deterioration of the combustion due to use of heavy fuel having low volatility, and the drop of the engine speed due to the deterioration of the combustion.

(3) The increase amount of the fuel injection amount is decreased as the coolant temperature is increased toward the value at which the combustion can be stabilized. Therefore, the increase amount of the fuel injection amount is decreased with time after the fuel injection amount starts to be increased. After the fuel injection amount is increased, as the engine temperature (the coolant temperature) is gradually increased, the volatility of the fuel in the combustion chamber 3 becomes higher, and the fuel concentration of the fuel-air mixture around the ignition plug 5 at the time of ignition becomes higher. Since the increase amount of the fuel injection amount can be decreased in accordance with the change in the fuel concentration, the fuel concentration can be suppressed from becoming extremely high.

(4) The ignition timing is advanced when the drop amount of the engine speed with respect to the predetermined value c is equal to or larger than the predetermined value d. Accordingly, when the drop amount is smaller than the predetermined value d, the combustion is stabilized only by increasing the fuel injection amount among increasing the fuel amount and advancing the ignition timing. When the drop amount is equal to or larger than the predetermined value d, the combustion is stabilized by both increasing the fuel injection amount and advancing the ignition timing. When the drop amount of the engine speed is small, the drop of the engine speed can be suppressed only by increasing the fuel injection amount. Accordingly, since the method of stabilizing the combustion is changed in accordance with the drop amount of the engine speed as described above, it is possible to suppress inhibition of the increase in the temperature of the exhaust gas (the increase in the temperature of the catalyst) due to unnecessary advance of the ignition timing (an unnecessary decrease in the delay amount).

(5) The execution period of the stabilization control after the engine is started is longer as the predetermined time a is longer. The execution period of the stabilization control that is restarted when the fuel injection mode is switched to the intake stroke injection is longer as the predetermined time b is longer. The predetermined time a can be changed based on the coolant temperature when the engine is started. The predetermined time b can be changed based on the coolant temperature when the fuel injection mode is switched. Since the volatility of the fuel in the combustion chamber 3 varies depending on the engine temperature (the coolant temperature), the period during which the drop of the engine speed due to the low fuel concentration of the fuel-air mixture around the ignition plug 5 at the time of ignition needs to be suppressed by the stabilization control, that is, the period during which the combustion becomes unstable varies depending on the engine temperature. Accordingly, since the predetermined time a and the predetermined time b can be changed based on the coolant temperature, the execution period of the stabilization control can be set to a required minimum period, and the drop of the engine speed can be appropriately suppressed.

For example, the aforementioned embodiment can be modified as follows. The predetermined time a may be fixed to a time required for stabilizing the combustion by the compression stroke injection, irrespective of the coolant temperature. Also, the predetermined time b may be fixed to a time required for stabilizing the combustion by the intake stroke injection, irrespective of the coolant temperature.

The combustion may be stabilized constantly by both increasing the fuel injection amount and advancing the ignition timing as the change in the controlled variables for stabilizing the combustion. Alternatively, the combustion may be stabilized constantly only by increasing the fuel injection amount or constantly only by advancing the ignition timing.

In the aforementioned embodiment, the combustion is stabilized by increasing the fuel injection amount by the increase amount value X, and then attenuating the increase amount value X as the change in the controlled variable for stabilizing the combustion. However, the mode of attenuating the increase amount value X may be changed as necessary.

In the aforementioned embodiment, the combustion is stabilized by advancing the ignition timing by starting to decrease the delay amount R of the ignition timing, and then attenuating the delay amount R, as the change in the controlled variable for stabilizing the combustion. However, the mode of attenuating the delay amount R may be changed as necessary.

What is claimed is:

1. A combustion control apparatus for an in-cylinder injection internal combustion engine, comprising:
   a stabilization controller which executes a stabilization control that stabilizes combustion by changing a controlled variable used for controlling operation of the engine when an engine speed drops in an engine warming-up process after the engine is started, wherein compression stroke injection is executed in the engine warming-up process;
   an execution stop controller which limits an execution period of the stabilization control during which the stabilization control is executed, and stops the stabilization control in the middle of execution of the compression stroke injection; and
   a restart controller which restarts the stabilization control when a fuel injection mode is switched from the compression stroke injection to intake stroke injection.

2. The combustion control apparatus according to claim 1, wherein the controlled variable includes a fuel injection amount, and the stabilization controller stabilizes the combustion by increasing the fuel injection amount.

3. The combustion control apparatus according to claim 2, wherein the stabilization controller decides an increase amount of the fuel injection amount based on a drop amount of the engine speed.

4. The combustion control apparatus according to claim 2, wherein the stabilization controller gradually decreases the increase amount of the fuel injection amount with time.

5. The combustion control apparatus according to claim 1, wherein the controlled variable includes at least one of a fuel injection amount and ignition timing, and the stabilization controller stabilizes the combustion by at least one of increasing the fuel injection amount and advancing the ignition timing.

6. The combustion control apparatus according to claim 5, wherein the stabilization controller decides an advance amount of the ignition timing based on a drop amount of the engine speed.

7. The combustion control apparatus according to claim 1, wherein ignition timing of the internal combustion engine is controlled to be delayed by a predetermined delay amount while the compression stroke injection is executed in the engine warming-up process, the controlled variable includes the ignition timing, and the stabilization controller stabilizes the combustion by advancing the ignition timing by making a delay amount become smaller than the predetermined delay amount.

8. The combustion control apparatus according to claim 7, wherein the controlled variable includes both a fuel injection amount and ignition timing, and the stabilization controller stabilizes the combustion by both increasing the fuel injection amount and advancing the ignition timing when a drop amount of the engine speed is larger than a predetermined amount; and the controlled variable includes only the fuel injection amount, and the stabilization controller stabilizes the combustion only by increasing the fuel injection amount among increasing the fuel injection amount and advancing the ignition timing when the drop amount of the engine speed is smaller than the predetermined amount.

9. The combustion control apparatus according to claim 1, wherein the stabilization controller changes the execution period of the stabilization control after the engine is started based on an engine temperature when the engine is started.

10. The combustion control apparatus according to claim 1, wherein the stabilization controller changes the execution period of the stabilization control that is restarted based on an engine temperature when the fuel injection mode is switched.

11. A combustion control apparatus for an in-cylinder injection internal combustion engine, comprising:
   stabilization means for executing a stabilization control that stabilizes combustion by changing a controlled variable used for controlling operation of the engine when an engine speed drops in an engine warming-up process after the engine is started, wherein compression stroke injection is executed in the engine warming-up process;

execution stop means for limiting an execution period of the stabilization control during which the stabilization control is executed, and stopping the stabilization control in the middle of execution of the compression stroke injection; and restart means for restarting the stabilization control when a fuel injection mode is switched from the compression stroke injection to intake stroke injection.

12. A combustion method for an in-cylinder injection internal combustion engine, comprising:

a first step of executing a stabilization control that stabilizes combustion by changing a controlled variable used for controlling operation of the engine when an engine speed drops in an engine warming-up process after the engine is started, wherein compression stroke injection is executed in the engine warming-up process;

a second step of limiting an execution period of the stabilization control during which the stabilization control is executed, and stopping the stabilization control in the middle of execution of the compression stroke injection; and a third step of restarting the stabilization control when a fuel injection mode is switched from the compression stroke injection to intake stroke injection.

13. The combustion method according to claim 12, further comprising a fourth step of stopping the stabilization control when an elapsed time since the stabilization control is restarted in the third step becomes equal to or longer than a predetermined time.

* * * * *